(12) United States Patent
Ratcliffe et al.

(10) Patent No.: US 10,814,764 B2
(45) Date of Patent: Oct. 27, 2020

(54) DUMPER VEHICLE

(71) Applicant: J. C. Bamford Excavators Limited, Uttoxeter, Staffordshire (GB)

(72) Inventors: Simon J. Ratcliffe, Uttoxeter (GB); Christopher J. Streat, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 7 days.

(21) Appl. No.: 15/965,667

(22) Filed: Apr. 27, 2018

(65) Prior Publication Data
US 2018/0312096 A1 Nov. 1, 2018

(30) Foreign Application Priority Data

Apr. 28, 2017 (GB) .................................. 1706859.4
Jul. 25, 2017 (GB) .................................. 1711991.8

(51) Int. Cl.
*B60P 1/28* (2006.01)

(52) U.S. Cl.
CPC .............. *B60P 1/28* (2013.01); *B60P 1/286* (2013.01)

(58) Field of Classification Search
CPC .. B60P 1/28; B60P 1/283; B60P 1/286; B60P 1/16; B60P 1/04; B60P 1/26; B60P 3/423; B60P 1/02; B60P 1/045
USPC ........... 298/17 R, 22 R, 17.5, 11, 17.8, 17 B, 298/22 P, 19 R, 24, 23 R, 23 M, 23 C; 414/183.2, 26.11, 205, 37.6, 57.1, 65.05; 296/809, 498, 24.5, 420, 422, 467, 812, 296/680, 646, 563
See application file for complete search history.

(56) References Cited

U.S. PATENT DOCUMENTS

2007/0188008 A1* 8/2007 Furman .................... B60P 1/283
  298/17 R
2012/0181843 A1* 7/2012 Gagnon .................... B60P 1/26
  298/17 R
2015/0175047 A1* 6/2015 Takahashi ................. B60P 1/16
  298/22 R
2017/0050550 A1* 2/2017 Danner ..................... B60P 1/16

FOREIGN PATENT DOCUMENTS

DE       202016101740 U1   7/2016
NL            296390 A    5/1965

OTHER PUBLICATIONS

Search Report for GB Patent Application No. 1706859.4, dated Oct. 3, 2017.

* cited by examiner

*Primary Examiner* — D Glenn Dayoan
*Assistant Examiner* — Sunsurraye Westbrook
(74) *Attorney, Agent, or Firm* — Marshall, Gerstein & Borun LLP

(57) ABSTRACT

A dumper vehicle includes: a frame comprising a front end and a rear end; front and rear wheels mounted to the frame; an operator seat mounted to the frame; and an open topped container for carrying a load therein mounted to the frame between the front and rear wheels, wherein the container is moveable between a transport position for transporting a load and a discharge position for discharging of a load; wherein the container defines an upper extent thereof, and wherein said upper extent of the container decreases in height with respect to a lower extent of the wheels towards the front end of the frame, when the container is in the transport position.

20 Claims, 6 Drawing Sheets

DUMPER VEHICLE

FIELD OF THE INVENTION

The present invention relates to a dumper vehicle.

BACKGROUND OF THE INVENTION

Dumper vehicles, often referred to as "site dumpers" are manufactured in various different sizes to suit the needs of the application, ranging from those required for small building sites to those required for large scale construction projects. A common dumper vehicle used for small building sites typically has an operating capacity (i.e. fully loaded) in the range of 6-9 metric tons.

A major problem faced when using dumper vehicles of this size is that as the skip of the dumper vehicle is provided in front of an operator, the forwards visibility of an operator is impaired. Further, due to height restrictions when the dumper vehicles are loaded onto trucks for transport, the position of the operator cannot simply be raised in order to improve visibility over the skip. A further problem encountered by dumper vehicles is that of stability during maneuvering of the vehicle if the vehicle is not operated in accordance with the operator's manual, e.g. when travelling at excessive speed over uneven ground, braking or steering abruptly.

The present invention seeks to overcome or at least mitigate one or more problems associated with the prior art.

SUMMARY OF THE INVENTION

A first aspect of the invention provides a dumper vehicle comprising: a frame comprising a front end and a rear end; front and rear wheels mounted to the frame; an operator seat mounted to the frame; and an open topped container for carrying a load therein mounted to the frame between the front and rear wheels, wherein the container is moveable between a transport position for transporting a load and a discharge position for discharging of a load; wherein the container defines an upper extent thereof, and wherein said upper extent of the container decreases in height with respect to a lower extent of the wheels towards the front end of the frame, when the container is in the transport position.

Advantageously, providing a dumper vehicle where the upper extent of a container decreases in height toward the front of the vehicle has been found to increase the visibility over the container of an operator sat in an operator seat.

The upper extent of the container may continuously decrease in height between a leading edge and a trailing edge of the container over a majority of the front to rear length of the container, preferably at least 75% of the front to rear length, more preferably at least 90% of the front to rear length Advantageously, this has been found to further increase the visibility over the container of an operator sat in an operator seat.

The upper extent of the container may comprise a front upper edge, a rear upper edge, and two side upper edges extending therebetween, where the two side upper edges may be linear and inclined.

The upper extent of the container may comprise a front upper edge, a rear upper edge, and two side upper edges extending therebetween, wherein the side upper edges may comprises a curved surface.

The frame may comprise a main chassis having the operator seat mounted thereto and an articulating front chassis having the container mounted thereto. A lower extent of the front chassis may be arranged to be lower than a lower extent of the main chassis.

Advantageously, mounting the container on a front chassis that is lower than the chassis on which the operator is situated has been found to increase the visibility over the container of an operator sat in an operator seat. Furthermore, such an arrangement lowers the center of gravity of the dumper vehicle, which improves the overall stability of the vehicle both when the container is loaded and empty.

The front chassis may be substantially non-linear.

The front chassis may comprise a front section and a rear section, further wherein the rear section has an upper surface substantially lower than the front section, e.g. at least 10 cm lower.

Advantageously, this lowers the position of the container, which further improves both the stability of the vehicle and the visibility over the container of an operator.

The container may comprise a lower surface including a substantially flat lowermost portion.

Advantageously, providing a flat bottom surface increases the volume at the bottom of the container for receiving a load, which works to lower the center of gravity of the vehicle, thus improving the stability of the vehicle.

The flat lower portion may be interposed between the front and rear wheels.

Advantageously, this moves the center of gravity of the loaded machine to be positioned between the front and rear wheels (i.e. closer to longitudinal the center of the vehicle), which improves the stability of the vehicle.

The length of the flat lower portion in a forward-rearward direction may be at least 25% of the total length of the container in a forward-rearward direction.

Advantageously, increasing the size of the flat lower portion of the container further increases the volume at the bottom of the container for receiving a load, which works to lower the center of gravity of the vehicle, thus improving the stability of the vehicle.

The lower surface of the container may comprise a first substantially linear inclined surface extending upwardly away from the flat portion towards the front end of the frame.

Advantageously, providing a linear angled surface that extends forwardly (i.e. towards and over the front wheels) reduces the angle between the flat lower portion and the front wall of the container, which minimizes the amount of residual material after unloading.

The linear angled surface may transition into a curved surface extending around the front wheels to a position substantially above the center of the wheel.

Advantageously, this arrangement works to maximize the available volume within the container for receiving a load.

The container may further comprise a second inclined surface extending upwardly away from curved surface.

Advantageously, the second inclined surface increases the fluid storage capacity of the container.

The second inclined surface may be substantially parallel to but offset from the first inclined surface.

Advantageously, this arrangement further minimizes the amount of residual material in the container after unloading.

The container may comprise a front edge, and the container may comprise a chute at said front edge.

Advantageously, providing a chute at the front edge aids in the discharge of material from the container.

The container may define an internal volume, and a majority of said internal volume may be positioned behind a rear extent of the front wheels.

Advantageously, this moves the center of gravity of the loaded machine to be positioned between the front and rear wheels (i.e. closer to longitudinal the center of the vehicle), which improves the stability of the vehicle.

The center of gravity of the vehicle may be maintained rearward of a rear extent of the front wheels.

Advantageously, this improves the stability of the vehicle.

The operator seat may be rotatably mounted to the frame for adjusting the operator seat between a forwards position and a rearwards position for carrying out a reverse drive operation.

An operator in the operator seat having a height of at least 173 cm may have a line of sight angle over the container of at least 20° below the horizontal, when the skip is unladen.

An operator in the operator seat having a height of at least 173 cm may have a line of sight angle over the container of at least 16° below the horizontal, when the skip is laden.

An operator in the operator seat having a height of at least 173 cm may have a line of sight angle over the container of at least 20° below the horizontal, when the skip is unladen.

The dumper may include an operator cab.

When the dumper vehicle tips over, an operator may attempt to quickly escape from the vehicle, which can result in an operator becoming crushed under the vehicle. Advantageously, provision of a cab improves the safety of the dumper vehicle for an operator, by preventing this from occurring.

BRIEF DESCRIPTION OF THE DRAWINGS

Embodiments of the invention will now be described by way of example only with reference to the accompanying drawings, in which.

DETAILED DESCRIPTION OF EMBODIMENT(S)

Figure 1:
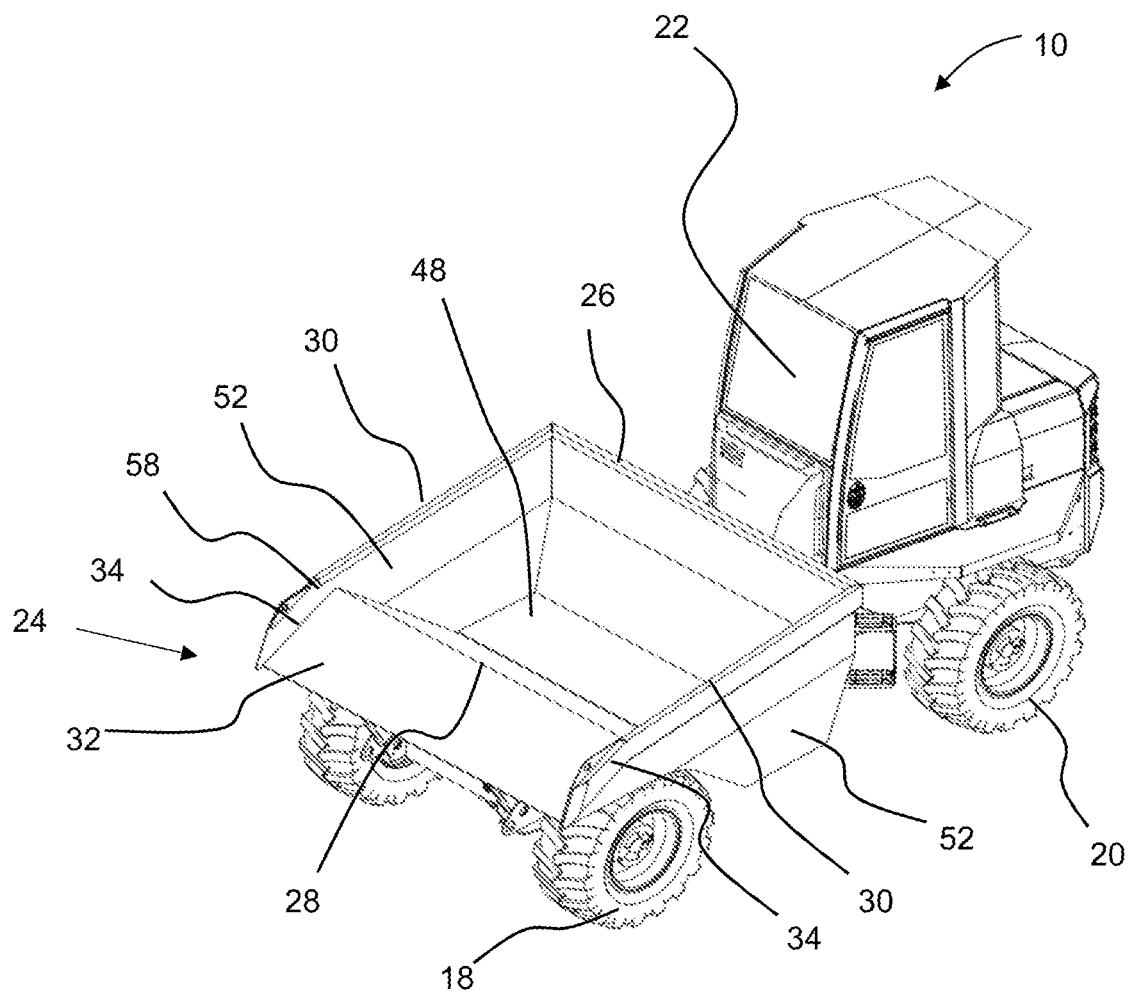
FIG. 1 is an isometric view of a dumper vehicle according to an aspect of the invention.
Figure 2:
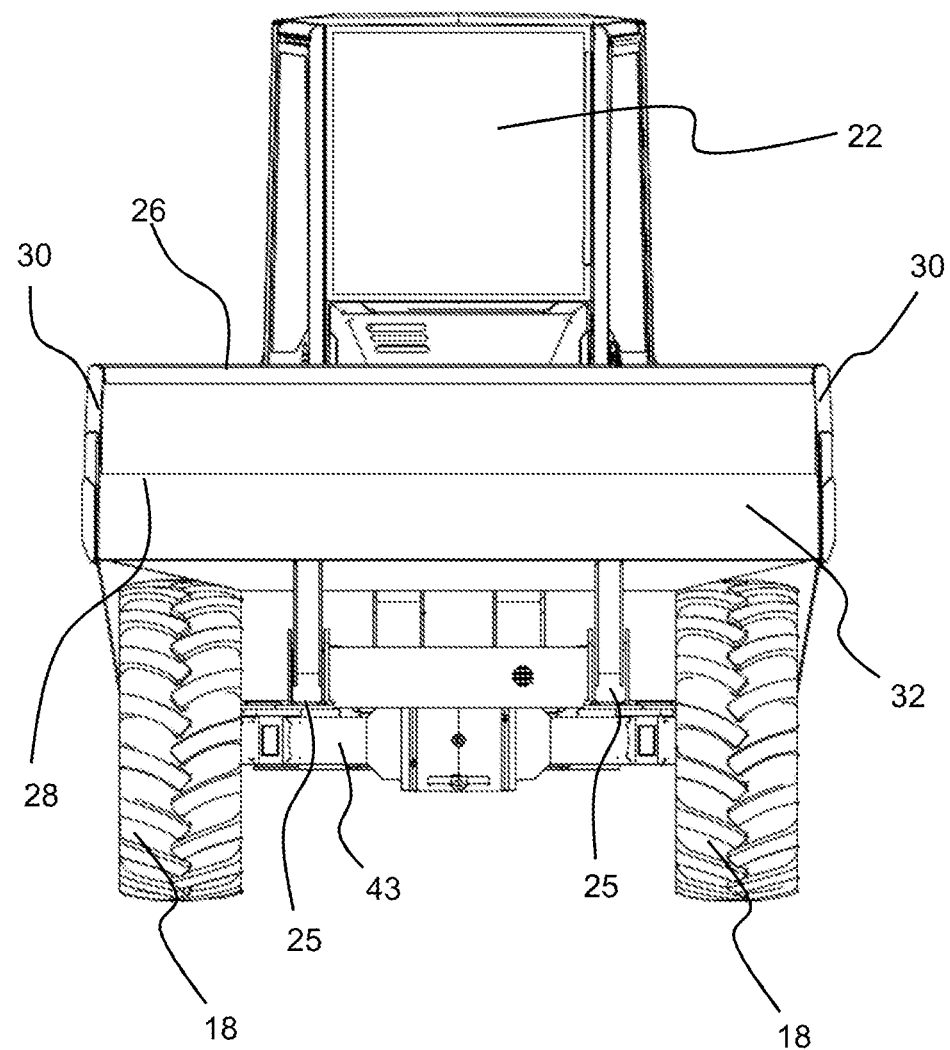
FIG. 2 is a front view of the dumper vehicle of FIG. 1.
Figure 3:
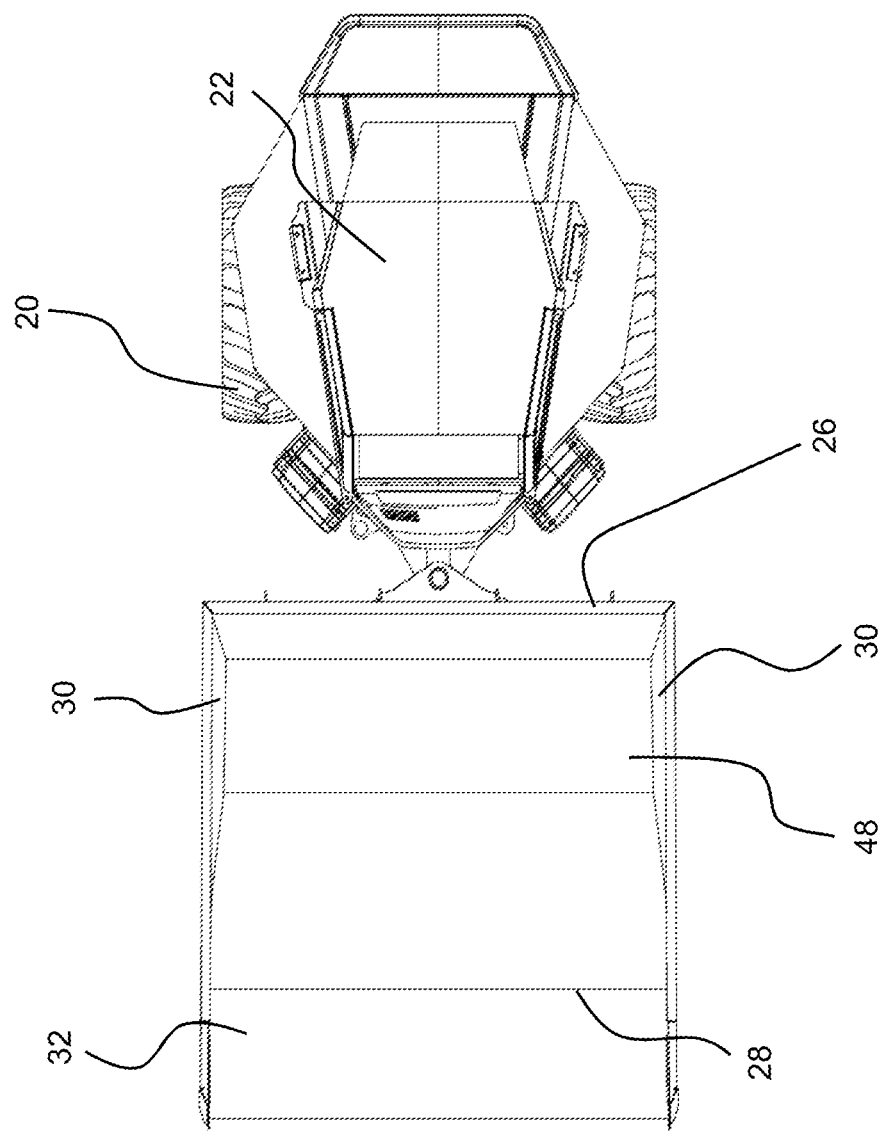
FIG. 3 is a top view of the dumper vehicle of FIG. 1.

Referring to FIGS. 1 to 6, there is illustrated a dumper vehicle 10 according to an embodiment of the present invention. The dumper vehicle 10 has a nominal laden capacity of 6 metric tons and a volume of heaped material (e.g. earth) of between 3.2-3.6 m3 and of flowable material (e.g. concrete) of approximately 2.0 m3. The vehicle 10 includes a structural chassis frame 12 having a front end 14 and a rear end 16. The frame 12 has two sets of wheels mounted to the frame, two front wheels 18 mounted proximate the front end 14 of the frame 12, and two rear wheels 20 mounted proximate the rear end 16 of the frame 12.

The frame 12 also has an operator seat mounted to the frame 12. In the illustrated embodiment, the operator seat is located proximate to the rear wheels 20 along the longitudinal length of the frame 12. In the illustrated embodiment, the operator seat is provided within an operator cab 22. However, it will be appreciated that in alternative arrangements, an operator cab 22 may not be provided and a roll cage will be used instead. A prime mover is mounted to the rear of the cab 22 within a housing 23, where the housing 23 forms the rear extent of the dumping vehicle 10.

The operator seat is mounted to the frame 12 so as to be rotatably fixed thereto. However, in alternative arrangements, the operator seat may be rotatable with respect to the frame 12 so as to enable an operator to adjust the seat position from a forwards position (i.e. facing the front end 14 of the frame 12) to a rearwards position (i.e. facing the rear end 16 of the frame 12) for carrying out a reverse drive operation.

Figure 6:
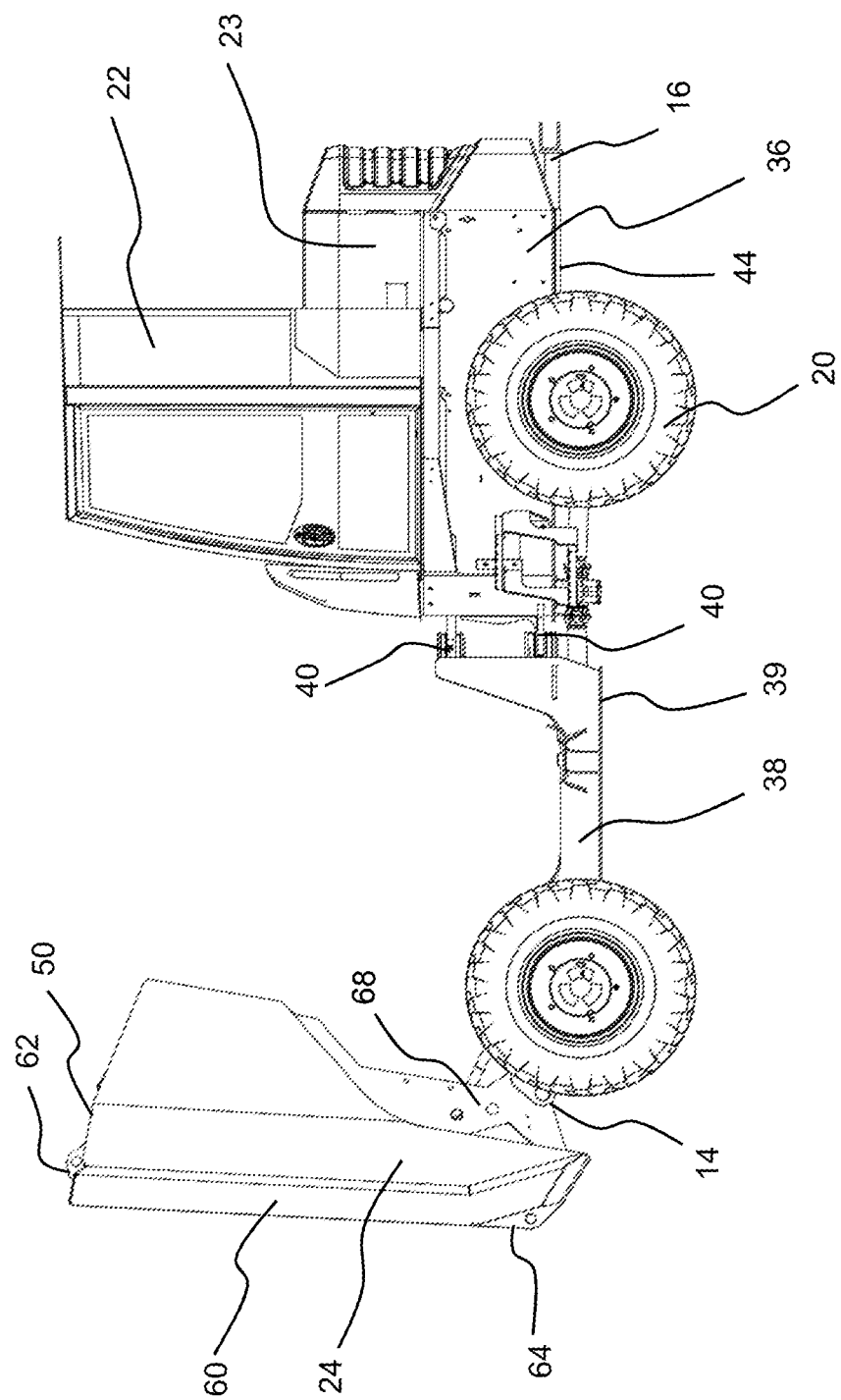
FIG. 6 is a side view of the dumper vehicle of FIG. 1 with a container thereof in a discharge position.

An open topped container 24 for carrying a load therein, commonly referred to as a skip, is also mounted to the frame 12. The container 24 is positioned such that a majority of the elongate length of the container 24 is situated between the front 18 and rear wheels 20. The container 24 is pivotally mounted to the frame 12, via two pivotable mounted 25, which enables the container 24 to be moveable or pivotable proximate the front of both the container 24 and the frame 12 between a transport position for transporting a load and a discharge position for discharging of a load. In FIGS. 1 to 5, the container 24 is illustrated as being in the transport position. In FIG. 6, the container 24 is illustrated as being in the discharge position.

The container 24 defines an upper edge thereof. The upper edge of the container including a rear upper edge 26, a front upper edge 28 and two side upper edges 30 extending therebetween. The container 24 is further provided with a front lip 32 extending substantially away and downward from the front edge 28 of the container 24. A pair of opposing side walls 34 are provided at the opposing side edges of the front lip 32. The combination of the front lip 32 and the opposing side walls 34 forms a chute at the front of the container 24, i.e. extending from the front edge 28 of the container 24. Providing such a chute enables the flow of material to be better directed forwards away from the front wheels 18 when it is being discharged from the container 24.

Figure 4:
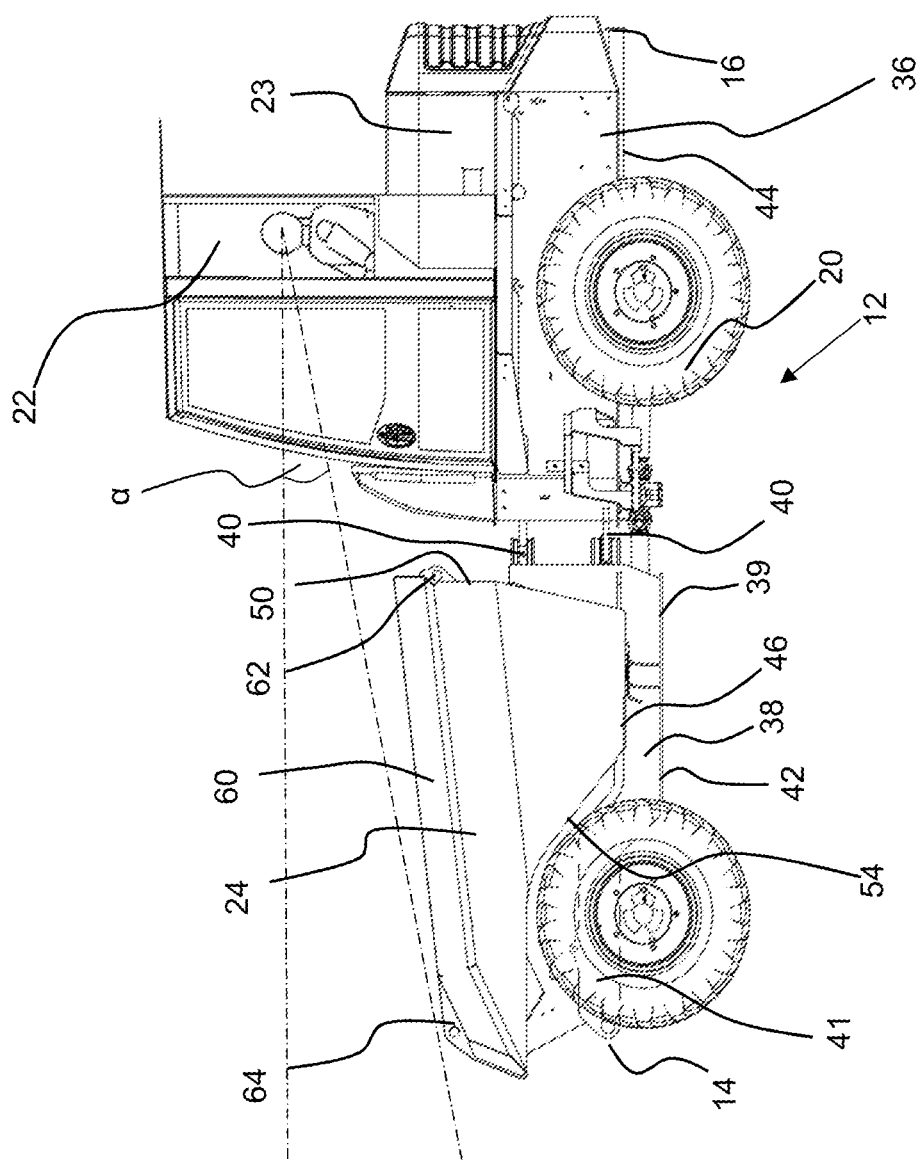
FIG. 4 is a side view of the dumper vehicle of FIG. 1.
Figure 5:
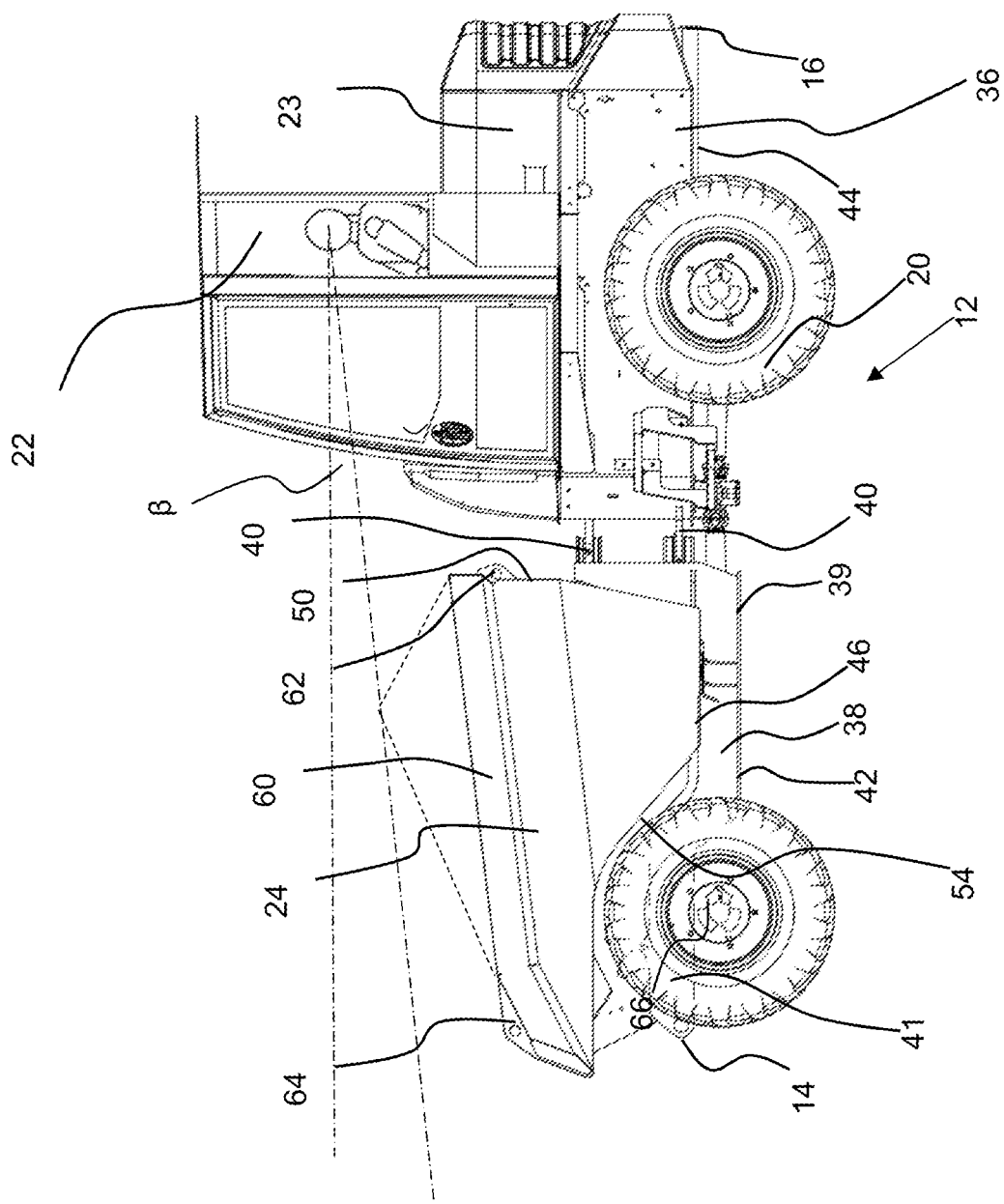
FIG. 5 is a side view of the dumper vehicle of FIG. 1.

As is more clearly illustrated in FIG. 4, the frame 12 of the dumper vehicle 10 is provided in two parts that are able to articulate about at least a vertical axis with respect to each other. That is, the frame 12 includes a main chassis 36 and a front chassis 38. The length of the frame 12, and of the dumper vehicle 10 as a whole, has been extended by approximately 46 cm compared to known dumpers of comparable capacity (e.g. the present applicant's current 6T front tip site dumper). The operator seat and operator cab 22 (or roll bar in alternative embodiments) are mounted to the main chassis 36. The container 24 is mounted to the front chassis 38. The main chassis 36 and the front chassis 38 are pivotally connected together via a linkage 40. The linkage 40 is such that the front chassis 38 is able to pivot or articulate about a vertical axis up to an angle of 35° with respect to the main chassis 36. This angle of articulation between the front chassis 38 and the main chassis 40 enables the dumper vehicle to maintain a similar turning circle for the extended frame length.

The front chassis 38 is positioned to be lower than the main chassis 36. In the illustrated embodiment, a lower extent 42 of the front chassis 38 is positioned to be lower than a lower extent 44 of the main chassis 36. This arrangement lowers the container 24 with respect to an operator in the operator seat or cab 22, which increases the operator's visibility over the container 24. In the illustrated embodiment, the container has been lowered by approximately 20 cm compared to known dumper vehicles. Lowering of the container 24 also lowers the center of gravity of the dumper vehicle 10, which improves the overall stability of the vehicle, both when the container 24 is fully loaded and when it is empty.

The front chassis 38 is non-linear in side view (as is shown in FIG. 4). The front chassis 38 has a substantially flat rear section 39. The rear section 39 of the front chassis 38 is arranged to be substantially lower than the main chassis 36. The rear section 39 is arranged to support the lower section 46 of the container 24, when the container 24 is in the transport position. The front chassis 38 further includes a front section 41 which extends upwardly and away from the rear section 39. The front section 41 is illustrated in broken lines on FIG. 4. The front chassis angles upwardly to a position above an axle 43 extending between the front wheels 18, and comprises a front section 41 that is substantially parallel to the rear part 39 of the front chassis 38. The front section 41, and so the front chassis 38, mounts to the front axle 43 at a position substantially above said front axle 43. This arrangement enables the container 24 to be supported on a portion 39 of the front chassis 38 that is substantially lower than the point of connection between an axle 43 and the front chassis 38. Further, this arrangement does not reduce the overall ground clearance of the vehicle since the lower extent of the front axle 43 remains lower than the lower extent of the front chassis and is not significantly lower than the drive shaft that transmits drive from the main chassis 36 to the front axle 43.

In the illustrated embodiment a lower extent 46 of the container 24 is positioned to be substantially level with the lower extent 44 of the main chassis 36. However, in alternative arrangements, it will be appreciated that the lower extent 46 of the container 24 may be positioned to be substantially below a lower extent 44 of the main chassis 36. This arrangement further improves both the stability of the vehicle 10 and the visibility over the container 24 of an operator. Additionally, lowering of the lower extent 46 of the container 24 enables the height of the container to be maximized without impairing on the visibility over the container 24 of an operator in the operator seat.

When mounted onto the frame 12 and in the transport position, the upper extent container 24 decreases in height towards the front end 14 of the frame 12. That is, the side upper edges 30 of the upper extent of the frame decrease in height towards the front end 14 of the frame 12. The upper extent of the container 24 (i.e. the side upper edges 30 thereof) continuously decreases in height between a leading edge 28 and a trailing edge 26 of the container 24, i.e. the side edges of the container do not include any substantially level regions. This decreasing height works to increase the visibility over the container 24 of an operator sat in an operator seat, whilst maximizing capacity. In the illustrated embodiment, this decreasing height is provided in the form of the upper side edges 30 of the container 24 defining a linear inclined surface. However, it will be appreciated that the upper edges 30 of the container 24 may be provided as a downwardly curved surface, or a combination of inclined and curved portions.

Arranging the container 24 as described above has been found to result in a line of sight over the front of the container of the dumping vehicle for an operator having a height of 173 cm (a 50th percentile operator) when seated in the operator's seat in excess of 16° below the horizontal when the skip is laden with heaped material (shown as angle β in FIG. 5), where the heaped material has a slope in a 2:1 ratio of length to height, and in excess of 20° below the horizontal when the skip is unladen (shown as angle α in FIG. 4). This is compared to normal lines of sight of 6° (laden) and 15° (unladen) for conventional dumping vehicles of this size. From these comparative angles, it will be appreciated that the line of sight of an operator over the container having a nominal heap of material therein is improved. This results in a significant reduction of the ground area around the dumping vehicle that is obscured by parts of the container 24 (and a heap of material container therein), which improves visibility for maneuvering the machine.

The container 24 is defines an internal volume for receiving a load therein. The majority of the internal volume of the container is positioned behind a rear extent of the front wheels 18 and in front of a forward extent of the rear wheels 20. This arrangement provides a more even weight distribution between front axle 43 and rear axle (not shown), i.e. a weight distribution that is close to 50:50 between front and rear axles, when the container 24 is loaded with material. Providing a more even weight distribution between the front and rear of the dumping vehicle 10 improves the stability and traction of the dumping vehicle 10.

The container 24 includes a lower surface 48, a rear surface 50 and two opposing side surfaces 52. The lower surface 48 of the container 24 includes a substantially flat lowermost portion, which defines the lowermost extent 46 of the container. The length of the flat lower portion 46 is at least 25% of the total length of the container in the direction between the front and rear ends of the frame 12. The substantially flat bottom surface 46 is positioned so as to be interposed between the front 18 and rear wheels 20.

Providing the container 24 with a substantially flat bottom surface 46 increases the storage capacity of the container at the bottom thereof, which works to lower the center of gravity of the vehicle. Lowering the center of gravity of the dumper vehicle 10 improves the stability of the vehicle 10. Positioning the flat lower surface to be interposed between the front and rear wheels positions the center of gravity of the machine closer to the actual center of the machine, which improves the stability of the vehicle.

In addition to the flat lower portion 46, the lower surface 48 of the container 24 further includes a substantially planar inclined surface 54 extending upwardly away from the lower flat portion 46, in a direction substantially towards the front edge 28 of the container 24. Providing this surface 54 as a substantially planar surface, rather than as a curved surface extending around the front wheel 18 works to reduce the incline between the flat lower surface 46 and the surface 54. Reducing this angle minimizes the amount of residual material in the container 24 after unloading.

The substantially planar inclined surface 54 extends upwardly away from the flat lower surface 46, such that a distal (forward) end of the inclined surface 54 forms the front edge 28 of the container 24. This planar inclined surface helps to increase the fluid storage capacity of the container, by raising the height of the front edge 28 of the container 24. Maximizing the fluid storage capacity is important for the transport of flowable materials, such a liquid concrete.

The container 24 further includes a reinforcing rib 60 extending around the rear edge 26 and two side edges 30 of the container. A first set of lifting eyes 62 are provided on the rear surface 50 of the container 24, proximate to the reinforcing rib 60. A second set of lifting eyes 64 are provided along the side edges 30 of the container 24, proximate the front edge 28 of the container 24. Providing the lifting eyes 62, 64 enable the container 24 to be lifted front the dumper vehicle 10 when required.

As discussed above, the container 24 is pivotally mounted to the frame 12. Specifically, the container 24 is pivotally mounted to the front chassis 36. In the illustrated embodiment, the container is mounted to the front section 41 of the front chassis 36. The pivot point 66 between the front chassis 36 and the container 24 is proximate the front 14 of the frame 12, i.e. it is forward of the front wheels 18 and the front axle 43. That is, the container 24 is arranged to pivot about a forward most end of the dumper vehicle 10. In order for the container 24 to pivot between the transport position and a discharge position, the dumper vehicle 10 is provided hydraulic rams 68. The hydraulic rams 68 are mounted to the front chassis 36 at a position proximate the front axle 43.

Although the invention has been described above with reference to one or more preferred embodiments, it will be appreciated that various changes or modifications may be made without departing from the scope of the invention as defined in the appended claims.

Although the invention has been described above in terms of the frame being provided in two parts, it will be appreciated that the frame could be provided as a single component and the dumper vehicle could instead be steered by conventional Ackermann steering or otherwise. The region of the frame on which the container is mounted could be substantially lower than the region of the frame on which the operator's seat is mounted.

In alternative arrangements, the rear upper edge of the container edge could be curved or angled downwardly from the center towards to side edges of the container so as to further increase visibility of an operator.

In an alternative skip arrangement, the substantially planar inclined surface may transition into a curved surface, which extends around an upper edge of the front wheels to a position substantially above the center of the front wheels. Curving around the upper edge of the front wheels helps to maximize the available volume within the container for receiving a load.

The lower surface of the container may further include a second planar inclined surface extending upwardly and forwardly away from the curved surface. The distal end of the second inclined surface may form the front edge of the container. The second inclined surface may be substantially parallel to, but offset from, the inclined surface 54.

The invention claimed is:

1. A dumper vehicle comprising:
   a frame comprising a front end and a rear end, wherein the frame comprises a main chassis and an articulating front chassis; and wherein the articulating front chassis is substantially non-linear in side view;
   front and rear wheels mounted to the frame;
   an operator seat mounted to the main chassis of the frame; and
   an open topped container for carrying a load therein mounted to the articulating front chassis of the frame between the front and rear wheels, wherein the container is moveable between a transport position for transporting a load and a discharge position for discharging of a load;
   wherein the container has an upper extent thereof, and wherein said upper extent of the container decreases in height with respect to a lower extent of the wheels towards the front end of the frame, when the container is in the transport position.

2. A dumper vehicle according to claim 1, wherein the articulating front chassis comprises a front section for mounting to a front axle and a rear section for supporting a base of the container, when the container is in the transport position, further wherein the rear section has an upper surface substantially lower than an upper surface of the front section.

3. A dumper vehicle according to claim 2, further comprising a front axle extending between the front wheels, wherein the front section mounts to the front axle at a point of connection substantially above said front axle.

4. A dumper vehicle according to claim 3, wherein the upper surface of the rear section is substantially lower than the point of connection between the front section and the front axle.

5. A dumper vehicle according to claim 3, wherein a lowermost extent of the front axle is lower than a lowermost extent of the front chassis.

6. A dumper vehicle according to claim 2, wherein the front section is substantially parallel to the rear section.

7. A dumper vehicle according to claim 1, wherein the operator seat is rotatably mounted to the frame for adjusting the operator seat between a forwards position and a rearwards position for carrying out a reverse drive operation.

8. A dumper according to claim 1, wherein the container comprises a lower surface including a substantially flat lowermost portion and a first substantially linear inclined surface extending upwardly away from the flat portion towards the front end of the frame, further wherein the linear angled surface transitions into a curved surface which extends around the front wheels to a position substantially above the center of said front wheels.

9. A dumper according to claim 8, wherein the container further comprises a second inclined surface extending upwardly away from curved surface.

10. A dumper container according to claim 9, wherein the second inclined surface is substantially parallel to but offset from the first inclined surface.

11. A dumper vehicle according to claim 1, wherein the container comprises a front edge, wherein the container further comprises a chute at said front edge.

12. A dumper vehicle according to claim 1, wherein the container defines an internal volume, and a majority of said internal volume is positioned behind a rear extent of the front wheels.

13. A dumper vehicle according to claim 1, wherein the center of gravity of the vehicle is maintained rearward of a rear extent of the front wheels.

14. A dumper vehicle according to claim 1, wherein an operator in the operator seat having a height of at least 173 cm has a line of sight angle over the container of at least 16° below the horizontal when the skip is laden.

15. A dumper vehicle according to claim 1, wherein the upper extent of the container comprises a front upper edge, a rear upper edge, and two side upper edges extending therebetween, further wherein the two side upper edges are linear and inclined over an entirety of said upper side edges.

16. A dumper vehicle according to claim 1, wherein a lower extent of the front chassis is arranged to be lower than a lower extent of the main chassis.

17. A dumper according to claim 1, further comprising an operator cab, wherein the operator seat is provided in the operator cab.

18. A dumper vehicle comprising:
   a frame comprising a front end and a rear end;
   front and rear wheels mounted to the frame;
   an operator seat mounted to the frame; and
   an open topped container for carrying a load therein mounted to the frame between the front and rear wheels, wherein the container is moveable between a transport position for transporting a load and a discharge position for discharging of a load;

wherein the frame comprises a main chassis having the operator seat mounted thereto and an articulating front chassis having the container mounted thereto, wherein the articulating front chassis comprises a front section for mounting to a front axle and a rear section for supporting the container, wherein the rear section is disposed rearward of the front wheels, and wherein when the container is in the transport position, further the rear section has an upper surface substantially lower than an upper surface of the front section.

19. A dumper vehicle according to claim 1, wherein the container comprises a lower surface including a substantially flat lowermost portion, and wherein the substantially flat lowermost portion is entirely interposed between the front and rear wheels.

20. A dumper vehicle according to claim 1, wherein the container has a lower extent that is opposite the upper extent and defines a space that accommodates the rear wheels.

* * * * *